United States Patent [19]
Henson

[11] Patent Number: 5,088,663
[45] Date of Patent: Feb. 18, 1992

[54] METHOD OF LAUNCHING PAYLOADS

[76] Inventor: Keith Henson, 1794 Cardel Way, San Jose, Calif. 95124

[21] Appl. No.: 543,224

[22] Filed: Jun. 25, 1990

[51] Int. Cl.⁵ ............................................. B64D 1/08
[52] U.S. Cl. ................................ 244/137.4; 244/137.4; 244/1 TD
[58] Field of Search ................. 244/137.1, 137.4, 63, 244/1 TD; 89/1.51, 36.16

[56] References Cited

U.S. PATENT DOCUMENTS

| | | | |
|---|---|---|---|
| 2,298,912 | 10/1942 | Alabrune | 244/137 |
| 2,373,086 | 4/1945 | Alabrune | 258/1.4 |
| 2,639,107 | 5/1953 | Brown | 244/137.1 |
| 2,977,853 | 4/1961 | Gehrkens et al. | 244/137.1 |
| 3,010,752 | 11/1961 | Geffner | 294/83 |
| 3,100,093 | 8/1963 | McQullen et al. | 244/3 |
| 3,167,278 | 1/1965 | Roberge | 244/137 |
| 3,351,325 | 11/1967 | Cotton | 258/1.4 |
| 3,373,994 | 3/1968 | Woodward | 244/1 TD |
| 4,170,341 | 10/1979 | Jacobsen | 254/172 |
| 4,416,436 | 11/1983 | Wilsan, Jr. | 244/137 |
| 4,852,455 | 8/1989 | Brum | 244/1 TD |
| 4,901,949 | 2/1990 | Elias | 244/63 |

FOREIGN PATENT DOCUMENTS

| | | | |
|---|---|---|---|
| 1229397 | 11/1966 | Fed. Rep. of Germany | 244/1 TD |
| 1456133 | 12/1968 | Fed. Rep. of Germany | 244/1 TD |
| 1336769 | 7/1963 | France | 244/1 TD |
| 2616745 | 12/1988 | France | 244/1 TD |

Primary Examiner—Joseph F. Peters, Jr.
Assistant Examiner—Anne E. Bidwell
Attorney, Agent, or Firm—Harrison & Egbert

[57] ABSTRACT

A method of launching a payload comprising the steps of extending the payload on a line from an airplane, flying the airplane so as to cause the payload to follow the path of the airplane, turning the airplane so as to cause the payload to follow a curved path at the end of the line, and releasing the payload from the line when the payload attains a desired velocity. The step of extending comprises carrying the payload on the airplane, opening the airplane so as to release the payload, and lowering the payload on the line from the airplane. The step of turning comprises banking the airplane so as to cause the payload to sling outwardly and turning the airplane in an involute downward spiral path so as to cause the payload to accelerate upwardly. The desired 12 speed is orbital velocity. The step of releasing comprises firing an explosive bolt at the end of the line so as to separate the payload from the line.

10 Claims, 2 Drawing Sheets

METHOD OF LAUNCHING PAYLOADS

TECHNICAL FIELD

The present invention relates to launch methods. More particularly, the present invention relates to launch methods for payloads into outer space.

BACKGROUND ART

Rockets inherently waste vast amounts of energy in comparison to the energy gained by the payload during typical launch activities. In recent years, several non-rocket methods to access space have been considered of which launch loops, tethers, and various cannons are examples. All of these methods suffer from one or more problems. For example, geosynchronous tethers push the limits of material science and require a very large initial investment. Gravity gradient (vertical) orbiting tethers cannot reach into the atmosphere. Rotating-/bolo types of tethers can reach into the atmosphere, but the logistics of attaching payloads is daunting. Cannons (electromagnetic, rail gun, and chemical) involve considerable expense because of the length required to reach orbital velocity. Also, payloads must punch through most of the atmosphere with these systems.

Various U.S. patents have described techniques of carrying payloads by cables attached to airplanes. For example, U.S. Pat. No. 2,373,086, issued on Apr. 10, 1945, to F. Alabrune describes a method for the conveying of loads by aircraft from inaccessible locations where no adequate support is available. This patent describes a method in which provision is made for the lifting of loads from a position at rest upon the ground to a position within or adjacent to one or more airplanes in flight. A long piece of rope or cable is extended from the bottom of the airplane and connected to a payload. The payload is raised from a stationary position on the ground by the use of a circular path of flying.

U.S. Pat. No. 3,351,325, issued on Nov. 7, 1967, to R. B. Cotton describes an aerial pickup and delivery system. In this patent, there is disclosed the use of an airplane having a first length of rope extending from the rear of the airplane and connected to a payload. A parachute is attached to the payload for the guidance of the payload.

U.S. Pat. No. 4,416,436, issued on Nov. 22, 1983, to F. M. Wilson describes a series of aerial maneuvers of two airplanes for the purpose of accomplishing pickup transport and delivery of a payload from and to a designated surface location. The payload is connected to and carried by the ends of cables extending from the airplane during these aerial maneuvers. The payload is disconnected from the end of the cables when the payload is delivered to its designated surface location. These airplane maneuvers include orbiting 180 degrees while banking at prescribed angles so as to effect a substantially vertical lifting and lowering of the payload relative to the pickup and delivery surface.

U.S. Pat. No. 3,100,093, issued on Aug. 6, 1963, to E. J. McQuillen et al., and U.S. Pat. No. 3,167,278, issued on Jan. 26, 1965, to F. D. Roberge, describe tethered methods of towing an aircraft or missiles.

It is an object of the present invention to provide a method of launching a payload which is economical.

It is another object of the present invention to provide a method of launching payloads which allows the simple and easy attainment of orbital velocity.

These and other objects and advantages of the present invention will become apparent from a reading of the attached specification and appended claims.

SUMMARY OF THE INVENTION

The present invention is a method of launching a payload into orbit that comprises the steps of: (1) extending the payload along a line from an airplane; (2) flying the airplane so as to cause the payload to follow the path of the airplane; (3) turning the airplane so as to cause the payload to follow a curved path at the end of the line; and (4) releasing the payload from the line when the payload attains a desired speed. As the airplane is turning, the payload accelerates and attains a velocity greater than the velocity of the airplane.

The payload is extended from the airplane by initially carrying the payload in the airplane. The airplane is then opened, as with a payload door, so as to release the payload from the airplane. The payload can then be lowered on the line from the airplane for a desired distance.

The step of turning the airplane comprises banking the airplane so as to cause the payload to sling outwardly and turning the airplane in an involute spiral turn pattern so as to cause the payload to accelerate. At all times, the payload is exterior to the circular path followed by the airplane during this involute spiral turn pattern. This involute spiral turn pattern is on a downward course such that the payload moves upwardly relative to the airplane. When the payload attains the desired speed, acceleration, and direction, an explosive bolt is fired at the end of the line so as to separate the payload from the line.

In the present invention, the line is a cable having a length of between five and fifteen kilometers. The aircraft is a relatively large aircraft having a weight of between 150 and 250 tons. The payload will have a weight of one ton or less. The payload is released when the payload achieves the necessary orbital velocity.

DETAILED DESCRIPTION OF THE INVENTION

Figure 1:
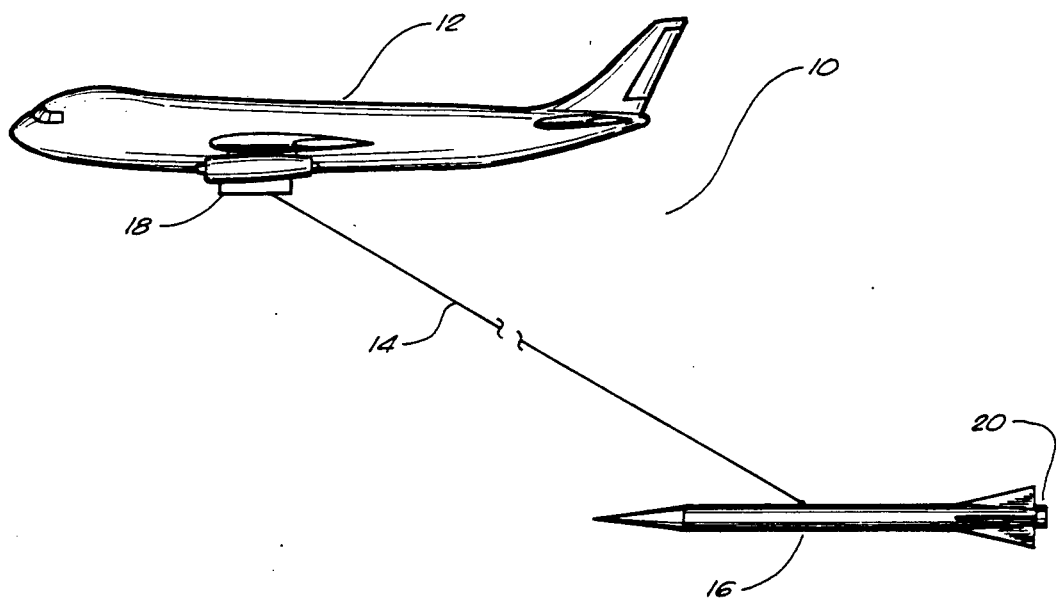
FIG. 1 is a view, in side elevation, of the system for launching a payload.

Referring to FIG. 1, there is shown at 10 the system for the launching of a payload. Payload launch system 10 comprises an airplane 12 a line 14, and a payload 16. The payload 16 is connected to the airplane 12 by line 14. Line 14 has a considerable length and is represented in broken line fashion.

In the preferred embodiment of the present invention, the airplane 12 is a 200 ton aircraft, such as a Boeing 747. For the economics of the present invention, it is important that the aircraft 12 be of sufficient size (such as between 150 and 250 tons) to transport a large size payload. It is also important that aircraft 12 has a suitable size so as to accommodate the long length of the line 14. Aircraft 12 includes suitable cargo doors 18. Initially, the payload 16 is contained within the interior of aircraft 12. To release the payload 16, the cargo doors 18 are opened. The line 14 is then reeled out along with the payload 16. As the airplane 12 is travelling, the payload 16 will generally follow the path of the aircraft 12.

Line 14 is a cable that connects the aircraft 12 to the payload 16 The preferred material for the cable 14 would have a low mass to high strength ratio. Commercial material such as KEVLAR (TM), SPECTRA (TM), or pulturded graphite-thermoplastic would be suitable. It is important that the cable be carefully shaped to minimize air drag. Also, it is important that the line 14 have sufficient strength to withstand the loads placed upon it during the course of the launching of the payload 16.

As shown in FIG. 1, payload 16 is in the form of a missile or a rocket. Although the embodiment shown in FIG. 1 shows the payload 16 as a rocket or a missile, various other payloads would be suitable for the purposes of the method of the present invention. Various materials could be transported into orbit by the present invention. Importantly, the payload 16, as shown in FIG. 1, includes an auxiliary propulsion system 20 that can assist the payload to achieve orbit. This auxiliary propulsion system 20 can be activated so as to allow the payload 16 to obtain orbital velocity. In the typical embodiment of the present invention, the payload 16 should have a weight of one ton or less. The weight of the payload 16 will be constrained by the size of the aircraft 12 and the strength of the line 14. The payload 16 is flown outwardly on the end of the line 14 so as to make an angle of about thirty degrees (30°) with the cable.

Figure 2:
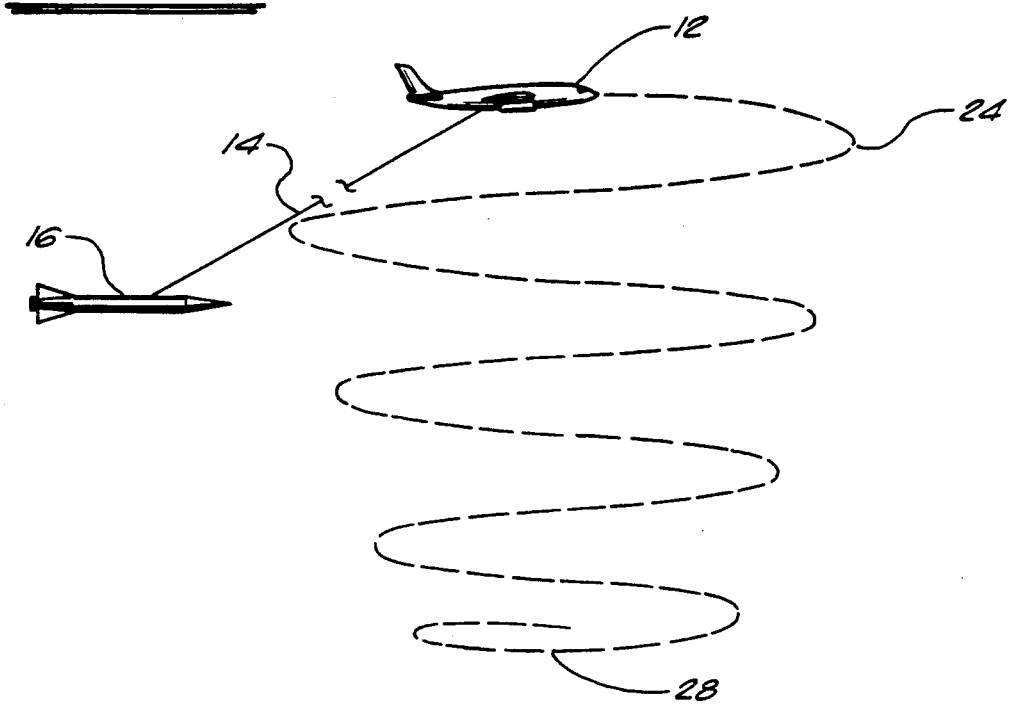
FIG. 2 is a view showing the downward involute spiral turn pattern for causing the payload to attain its desired speed.
Figure 3:
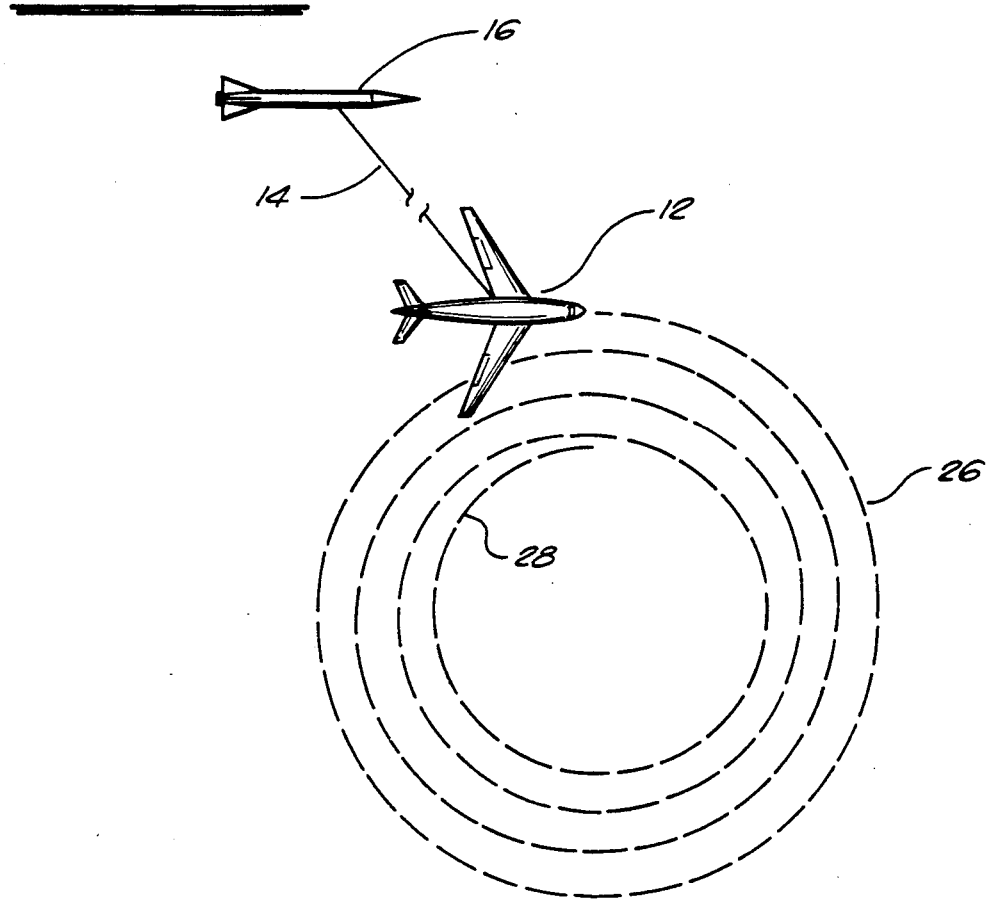
FIG. 3 is a top view showing the downward involute spiral turn pattern for the method of the present invention.

FIGS. 2 and 3 illustrate the method of the present invention for the purposes of launching the payload 16. As can be seen in FIGS. 2 and 3, the aircraft 12 is connected by extended line 14 to the payload 16. As stated previously, the line 14 will be a cable having a length of between five and fifteen kilometers. So as to execute the launching sequence in accordance with the method of the present invention, the aircraft 12 will follow an involute spiral flight pattern. FIGS. 2 and 3 illustrate the side and top views of this involute spiral flight pattern. Specifically, as seen in FIG. 2, aircraft 12 will traverse the path of the dotted line pattern 24. With reference to FIG. 3, the aircraft 12 follows the circular pattern 26 so as to effect the spiral.

After the payload 16 is deployed from the aircraft 12 in the manner described herein previously, the aircraft enters a banking turn as shown by the circular spiral pattern 26 of FIG. 3. The payload 16 is then slung (and flown aerodynamically) outward on the end of line 14. The aircraft then executes an involute spiral turn indicated by dotted portions 24 and 26 of FIGS. 2 and 3, respectively. At the end of the downward spiral turn, the aircraft ends at an inner loop 28. The aircraft drops in altitude (as shown in FIG. 2) as required to maintain velocity against the decelerating force on the cable. While the aircraft 12 traverses the pattern indicated by dotted lines 24 and 26 of FIGS. 2 and 3, the payload follows a larger circle, accelerating as the aircraft 12 is pulled into a tighter circle. When the payload 16 achieves its desired velocity and desired heading, the cable 14 is released from the payload 16 from line 14. An explosive bolt may be employed so as to be remotely actuated for the purpose of releasing the payload 16. After the payload 16 is released from the aircraft 12, the cable 14 is then recovered. When the cable 14 is recovered, another payload may be attached to the end of the cable within the aircraft 12 or elsewhere. The aircraft can also be flown back to altitude and the maneuver repeated. By the method of the present invention, the payload 16 may be properly slung into orbit.

The potential energy available from dropping a two hundred ton aircraft approximately ten kilometers is enough to raise a one ton payload to two thousand kilometers (in the same g field) or to accelerate a one ton payload to about 6.5 kilometers per second. Of course, practical difficulties, such as air drag and centrifugal acceleration, may impose somewhat lower limits. In essence, the present invention utilizes the atmosphere as a pivot and a long cable to transfer energy from the aircraft to the payload. In this manner, the present invention achieves the launch at a level high above the ground. Much of the expensive cost involved in other techniques for launching is eliminated. As such, the present invention offers an effective, reusable, and inexpensive alternative to the launching of payloads.

The foregoing disclosure and description of the invention is illustrative and explanatory thereof. Various changes in the method steps, as well as in the details of the illustrated device, may be made within the scope of the appended claims without departing from the true spirit of the invention. The invention should only be limited by the following claims and their legal equivalents.

I claim:

1. A method of launching a payload comprising:
 extending said payload on a line from an airplane;
 flying said airplane so as to cause said payload to follow the path of said airplane;
 turning said airplane so as to cause said payload to follow a curved path at the end of said line, said payload having a velocity greater than the velocity of said airplane, said step of turning comprising:
 banking said airplane so as to cause said payload to sling outwardly; and
 turning said airplane on a downward pathway, said payload accelerating upwardly relative to said airplane; and
 releasing said payload from said line when said payload attains a desired velocity.

2. The method of claim 1, said step of extending comprising the steps of:
 carrying said payload in said airplane;
 opening said airplane so as to release said payload; and
 lowering said payload on said line from said airplane.

3. The method of claim 1, said step of releasing comprising the step of:
 firing an explosive bolt so as to separate said payload from the end of said line.

4. The method of claim 1, said cable having a length of between five and fifteen kilometers, said aircraft having a weight of between one hundred and fifty and two hundred and fifty tons, said payload having a weight of one ton or less.

5. A method of launching a payload comprising the steps of:
 extending said payload on a line from an airplane;
 flying said airplane so as to cause said payload to follow a path corresponding to the path of said airplane;
 turning said airplane in an involute downward spiral flight path so as to increase the velocity of said payload; and releasing said payload from said line when said payload attains a desired velocity.

6. The method of claim 5, said step of extending comprising the steps of:
   carrying said payload in said airplane;
   opening said airplane so as to release said payload; and
   lowering said payload on said line from said airplane.

7. The method of claim 5, said step of releasing comprising:
   firing an explosive bolt so as to separate said payload from the end of said line.

8. The method of claim 5, said line being a cable having a length of between five and fifteen kilometers, said aircraft having a weight of between one hundred and fifty and two hundred and fifty tons, said payload having a weight of one ton or less.

9. A method of launching a payload comprising the steps of:
   connecting said payload to a line attached to an airplane;
   opening said airplane so as to release said payload from said airplane;
   lowering said payload on said line from said airplane;
   flying said airplane so as to cause said payload to follow the path of said airplane;
   turning said airplane so as to cause said payload to follow a curved path at the end of said line, said turning being on a path so as to cause said payload to accelerate, said step of turning comprising:
      banking said airplane so as to cause said payload to sling outwardly; and
      turning said airplane in a downward flight pattern so as to cause said payload to accelerate; and
   releasing said payload from said line when said payload attains a desired velocity.

10. The method of claim 9, said step of releasing comprising:
   firing an explosive bolt so as to separate said payload from the end of said line when said payload attains a desired velocity.

* * * * *